United States Patent
Golovashchenko

(10) Patent No.: US 8,545,157 B2
(45) Date of Patent: Oct. 1, 2013

(54) METAL MEMBERS AND ASSEMBLIES THAT HAVE REINFORCED PUNCHED HOLES AND METHOD OF FORMING THE HOLES

(75) Inventor: Sergey Fedorovich Golovashchenko, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 178 days.

(21) Appl. No.: 13/157,357

(22) Filed: Jun. 10, 2011

(65) Prior Publication Data

US 2012/0315109 A1 Dec. 13, 2012

(51) Int. Cl.
*F16B 43/00* (2006.01)

(52) U.S. Cl.
USPC .................. 411/531; 411/547; 16/2.1; 29/512

(58) Field of Classification Search
USPC .................. 411/531, 543, 547, 520, 522, 530, 411/501, 503; 16/2.1; 29/512, 513
See application file for complete search history.

(56) References Cited

U.S. PATENT DOCUMENTS

| | | | |
|---|---|---|---|
| 92,199 A * | 7/1869 | Mair | 24/713.7 |
| 1,289,073 A * | 12/1918 | Appleton | 285/201 |
| 1,599,446 A * | 9/1926 | Wege | 312/350 |
| 2,254,924 A * | 9/1941 | Williams | 285/203 |
| 2,379,804 A * | 7/1945 | Johnson | 411/302 |
| 2,639,637 A * | 5/1953 | Stirzel | 73/862.21 |
| 3,866,287 A * | 2/1975 | Dulude et al. | 29/896.91 |
| 4,371,293 A * | 2/1983 | Wilcox et al. | 405/302.1 |
| 4,473,714 A * | 9/1984 | Brownell et al. | 174/78 |
| 5,628,587 A * | 5/1997 | Lesslie | 405/302.1 |
| 6,631,630 B1 | 10/2003 | Pourboghrat et al. | |
| 6,708,542 B1 | 3/2004 | Gafri et al. | |
| 6,968,723 B2 | 11/2005 | Akahane et al. | |
| 7,318,696 B2 | 1/2008 | Babej et al. | |

* cited by examiner

*Primary Examiner* — Flemming Saether
(74) *Attorney, Agent, or Firm* — Damian Porcari; Brooks Kushman P.C.

(57) ABSTRACT

A metal member defining a hole in which the hole is reinforced by forming a flange and turning the flange back upon itself so that the rolled outer surface of the flange defines the perimeter of the hole. The sheared edge is spaced from the perimeter of the hole. The shaft of the fastener inserted in the hole contacts a non-sheared surface. A reinforcement ring may be assembled around the flange.

20 Claims, 3 Drawing Sheets

METAL MEMBERS AND ASSEMBLIES THAT HAVE REINFORCED PUNCHED HOLES AND METHOD OF FORMING THE HOLES

TECHNICAL FIELD

This disclosure relates to metal members that define punched holes that are more robust, assemblies that have the reinforced hole geometry and techniques employed for producing more robust hole geometries.

BACKGROUND

Vehicle manufacturers are turning away from mild steel sheet panels to aluminum, advanced high strength steel (AHSS), or ultra high strength steel (UHSS) panels. Aluminum, AHSS, and UHSS offer high strength/low weight alternatives to mild steel. These panels, however, have lower ductility than mild steel. One problem found with Aluminum, AHSS and UHSS is cracks developing from the sheared surface of punched holes during dynamic loading.

Due to elevated sensitivity to sheared surface stretchability in AHSS, cracks propagate from the sheared surfaces of the panels during dynamic loading changing the failure mode of the materials. Since mild steels are less sensitive to edge cracking, the failure mode for mild steel panels offered energy absorbing plastic deformation. The failure mode of high strength/low weight alternative material panels do not absorb loading energy as efficiently when cracks are propagated.

Punching is a metal forming process in which material is sheared from a metal member to create a hole. A punch shears a hole in the metal member and the sheared material, also known as a slug, falls away as scrap. In this process, the perimeter of the hole is defined by a sheared surface.

A fastener may be inserted into a hole to join objects together. The fastener has a shaft that passes through the hole of an object to fasten the object to another object. The shaft of the fastener typically abuts the sheared surface of a punched hole.

Sheared surfaces have microscopic cracks. When force is applied to objects that are fastened together with a fastener, the shaft of the fastener may apply stresses to the sheared surface of the hole. The microscopic cracks in the sheared surface of the hole are stress risers that are at locations where tears initiate in the metal member. Sheared surfaces tend to crack, rip, or tear beginning at the cracks due to stresses applied by the fastener.

The following references were considered before filing this application: U.S. Pat. No. 6,968,723 to Akahane et al., U.S. Pat. No. 7,318,696 to Babej et al., U.S. Pat. No. 6,708,542 to Gafri at al., and U.S. Pat. No. 6,631,630 to Pourboghrat et al.

SUMMARY

A method of forming a radiused flange on a metal member to integrally reinforce a hole is disclosed. The method delivers substantial improvement in the failure mode of a punched hole in a material with higher edge cracking sensitivity by moving the sheared surface away from the hole perimeter. The flange is turned back upon itself and the outer/rolled surface of the flange becomes the perimeter of the hole as opposed to the sheared surface being the perimeter of the hole. The method produces a metal member with a hole with a non-sheared surface of the metal member forming the hole perimeter. The non-sheared surface of the metal member is more robust under dynamic loading that applies stresses to the hole than a sheared surface under the same conditions.

According to another aspect of the disclosure, a reinforcement ring, preferably having a higher tensile strength than the metal member, is assembled around the flange and is retained by the flange as the flange is turned back upon itself. Alternatively, a reinforcement filler material such as a brazing deposit or high strength adhesive may be applied to the flange where the flange is turned back upon itself. In either of these additional aspects, the reinforcement ring, brazing, or high strength adhesive adds robustness to the hole and increases energy absorption during dynamic loading.

According to yet another aspect of the disclosure, a fastener is disposed within the hole with a shaft that abuts the rolled surface of the flange. The fastener may have a head that contacts the area of the flange between the rolled surface and the sheared edge, either directly or indirectly. As the fastener is tightened, the head clamps against the flange. Alternatively, the fastener may clamp a second object that contacts the area of the flange between the rolled surface and the sheared edge. In either aspect, the combination may include reinforcement filler material, a reinforcement ring, or no reinforcement at all.

According to still another aspect of the disclosure, a die is disclosed for punching a hole with a flange that forms the flange back upon itself. In the illustrated embodiment, a flange about a hole is formed back upon itself by the die. The die may form the flange with or without a reinforcement ring. The illustrated embodiment shows the flange being formed back upon itself in a single die, however, a single die could pierce and flange from one side with a second die forming the flange back upon itself from the other side.

DETAILED DESCRIPTION

Figure 1:
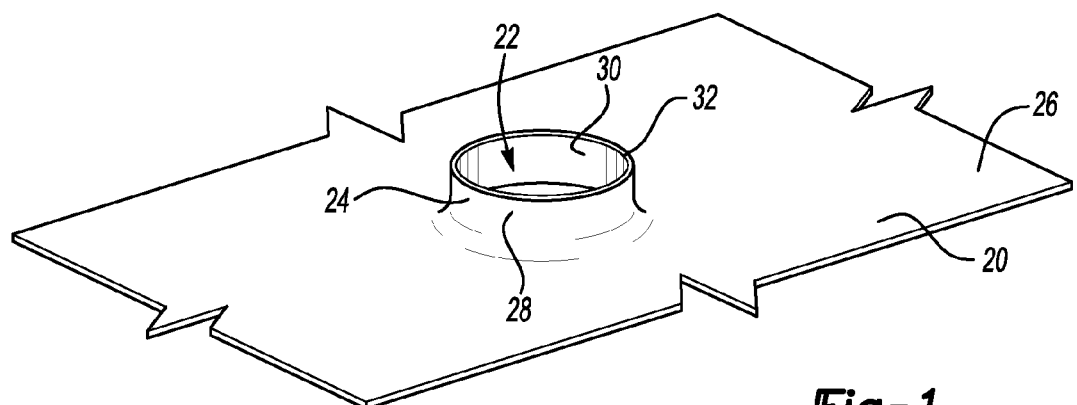
FIG. 1 is a perspective view of a metal member with a flange defining a hole.

Several embodiments are disclosed in the following specification. The same reference numerals are used in different embodiments in which the same elements are included in later embodiments to simplify the description.

Referring to FIG. 1, a metal member 20 is shown that defines a hole 22. In this figure, the hole 22 is defined by a flange 24 extending away from one side 26 of the metal member 20. The flange 24 has what will become an inner surface 28 and an outer surface 30 of the formed flange 24 when it is turned back upon itself. A sheared edge 32 of the flange 24 is formed during the punching and flanging operations that created the hole 22. The sheared edge 32 extends between inner surface 28 that is opposite the outer surface 30.

Figure 2:
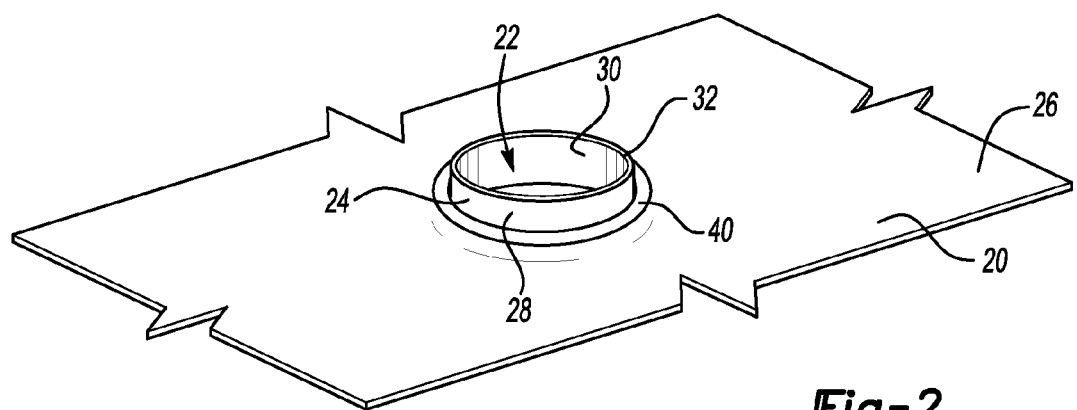
FIG. 2 is a perspective view of a metal member with a flange defining a hole and a reinforcement ring disposed around the flange.

Referring to FIG. 2, the flange 24 defining the hole 22 in the metal member 20 further includes a reinforcement ring 40 that is disposed around the flange. The reinforcement ring 40 may be made from any number of materials such as, but not limited to, a steel washer, a filler material such as brazing, or a high strength adhesive. The reinforcement ring 40 may be formed of a material that has a higher tensile strength than the metal member 20. The reinforcement ring 40 is adjacent to the underside surface 28 of the flange 24. When the flange 24 is turned back upon itself, the underside surface 28 retains the reinforcement ring about the hole. In some embodiments, a noncorrosive coating is applied to the reinforcement ring 40. In other embodiments, an adhesive is applied to the surface of the reinforcement ring 40 to bond the reinforcement ring to the metal member 20.

Figure 3:
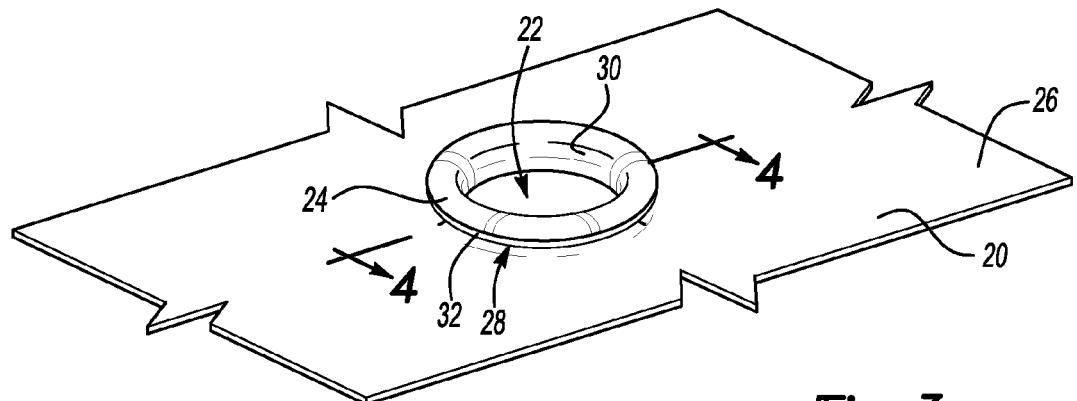
FIG. 3 is a perspective view of a metal member with a flange defining a hole in which the flange has been formed back upon itself.

Referring to FIG. 3, the flange 24 extends from one side 26 of the metal member 20 and is turned back upon itself. The outer surface 30 defines the hole 22 and the sheared edge 32 is spaced away from the hole 22. The flange 24 is shown as one continuous circular flange and the outer surface 30 of the continuous circular flange defines the circumference of the hole 22. It should be noted, however, that the flange 24 need not be circular or continuous. An alternate embodiment may have a continuous flange 24 defining an oblong or polygonal hole (not shown), in which case the outer surface 30 of the continuous flange 24 would define the oblong or polygonal perimeter of the hole 22.

The sheared edge of the material may only need reinforcing in a single direction during dynamic loading. In cases such as this, only a portion of the perimeter of the whole need to have an outer surface 30 formed by turning a flange 24 back upon itself. In this case, the flange 24 would be a non-continuous flange (not shown) and the outer surface 30 of the flange 24 would only define a portion of the hole 22. The hole 22 may be defined by a number of non-continuous flanges (not shown), all turned back upon themselves and each having an outer surface 30 defining a portion of the perimeter of the hole. The outer surfaces may define all of the perimeter or sections of the perimeter may remain as a sheared surface.

Referring to FIG. 3, the final product is shown to comprise the metal member 20 with the flange 24 turned back upon itself to define the hole 22. In this figure, the hole 22 is reinforced solely by the flange 24. The sheared surface 32 is formed away from the perimeter of the hole 22 so that the perimeter of the hole 22 has a non-sheared surface. This locates the micro-cracks associated with a sheared surface away from the contact surface of the hole and makes the hole more robust. This design reinforces the hole in any metal member and greatly improves the robustness of Aluminum, AHSS, and UHSS metals that offer high strength/low weight alternatives to mild steel.

Figure 4:
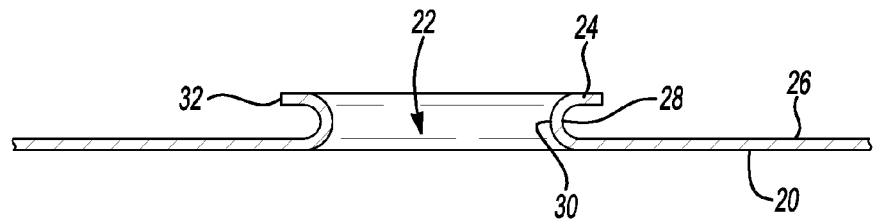
FIG. 4 is a cross-sectional view taken along line 4-4 in FIG. 3 showing the flange formed back upon itself.

Referring to FIG. 4, a cross-sectional view of FIG. 3 through line 4-4 is shown. The flange 24 is shown turned back upon itself and the outer surface 30 of the flange 24 is shown defining the perimeter of the hole 22 in the metal member 20. The underside surface 28 is shown opposite the outer surface 30, and the sheared edge 32 which adjoins both the underside surface 28 and the outer surface 30 is spaced away from the hole 22. The underside and outer surfaces 28, 30 have a bend radius selected based upon the metal member material formability.

Figure 5:
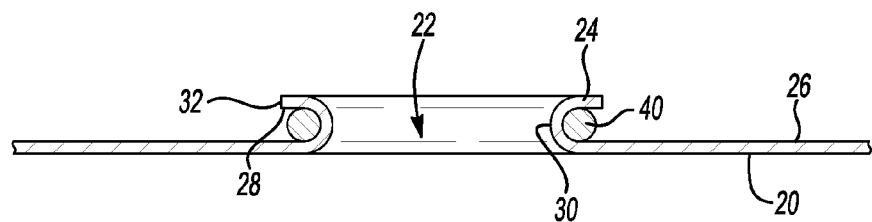
FIG. 5 is a cross-sectional view similar to that in FIG. 4 showing the flange formed back upon itself retaining a circular reinforcement ring about the hole.

Referring to FIG. 5, a cross-section of the reinforcement ring 40 is shown disposed around the hole 22 and is retained by the underside surface 28 of the flange 24. The radial cross-section of the reinforcement ring 40 is circular. Alternatively, the radial cross-section of the reinforcement ring 40 may be any shape such as an ellipse, a semi-circle, a polygon, or any combination of such shapes. The reinforcement ring 40 may be a washer with a polygonal radial cross-section. The reinforcement ring 40 may be a brazing deposit having an irregular radial cross-section or a series of substantially elliptical cross-sections.

The flange 24 has a bend radius selected based upon the metal member material formability. A reinforcement ring 40 is selected that has a cross-section that corresponds to the bend radius and the thickness of the metal member. The radius of the cross-section of the reinforcement ring 40 with a circular cross-section should be equal to or greater than the minimum bend radius of the material being formed around the reinforcement ring. This ensures that the flange 24 retains the reinforcement ring 40. This also allows the reinforcement ring 40 to act as a forming anvil preventing the flange from bending more sharply than the minimum bend radius. The material may have a split on the outer bent surface if the minimum bend radius of the material is exceeded.

Figure 6:
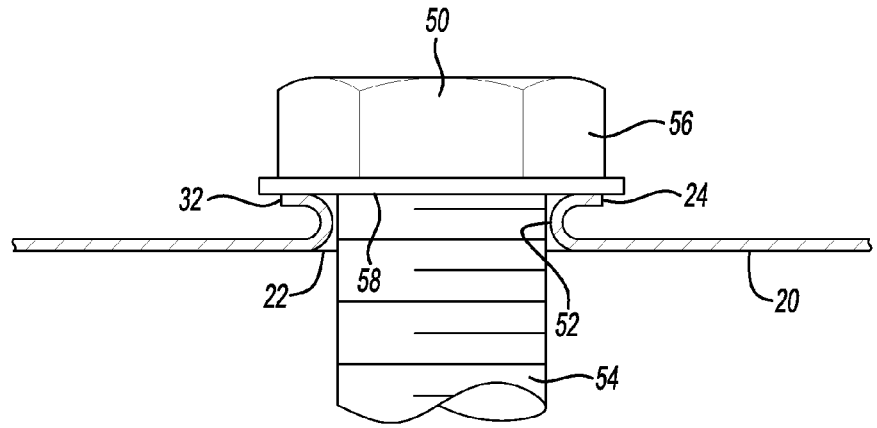
FIG. 6 is the cross-sectional view of the metal member with a flange as shown in FIG. 4 with a fastener disposed in the hole.

Referring to FIG. 6, a fastener 50 is shown disposed in the hole 22 defined by the metal member 20. The perimeter of the hole 22 is defined by rolled surface 52 of the reversely turned flange 24. The fastener 50 has a shaft 54 and a head 56 with a head surface 58 that is substantially perpendicular to the shaft 54. The shaft 54 contacts a portion of the rolled surface 52 and the head surface 58 contacts the flange 24 between the portion of the rolled surface 52 defining the perimeter of the hole and the sheared edge 32. The fastener 50 may be inserted in the hole 22 in the opposite orientation with the head 56 being on the lower end of the shaft 54 as viewed in FIG. 6.

Figure 7:
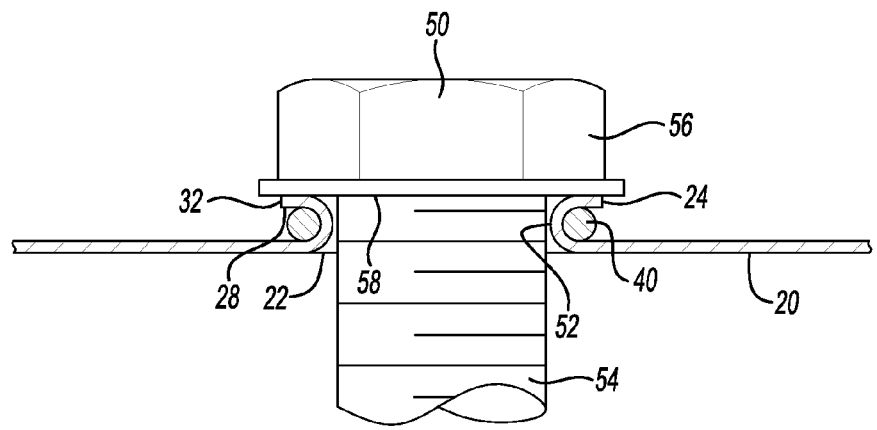
FIG. 7 is the cross-sectional view of the metal member with a flange as shown in FIG. 5 with a fastener disposed in the hole.

In the embodiment shown in FIG. 7, the reinforcement ring 40 is disposed around the hole 22 and retained by the reversely turned flange 24. In alternative embodiments, a filler material, such as a brazing or high strength adhesive, may be inserted in the space defined by the underside surface 28 of the reversely turned flange 24 in place of the reinforcement ring 40. The head surface 58 clamps the flange 24 as the fastener 50 is tightened. Alternatively, a second object (not shown) may contact the area of the flange between the rolled surface 52 and the sheared edge 32 that clamps against the flange 24 as the fastener 50 is tightened.

Figure 8:
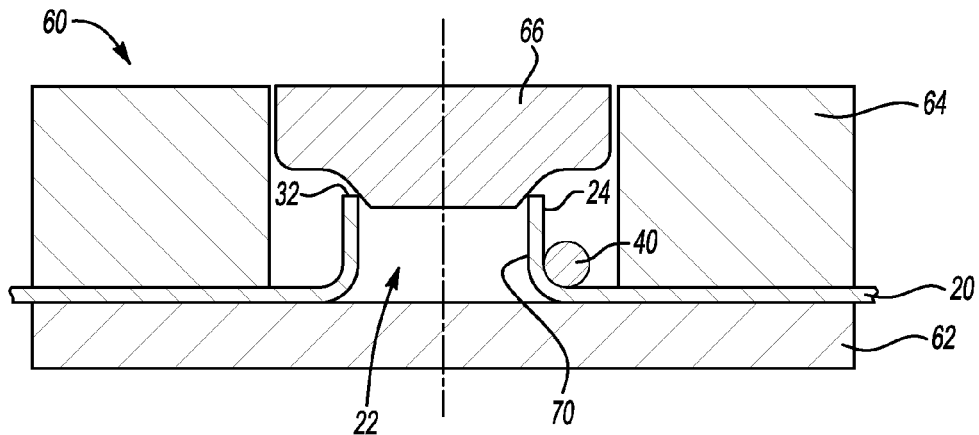
FIG. 8 is a cross-sectional view of a die in an initial phase of forming the flange back upon itself, wherein the right half of the view includes a reinforcement ring and the left half of the view does not include a reinforcement ring.
Figure 9:
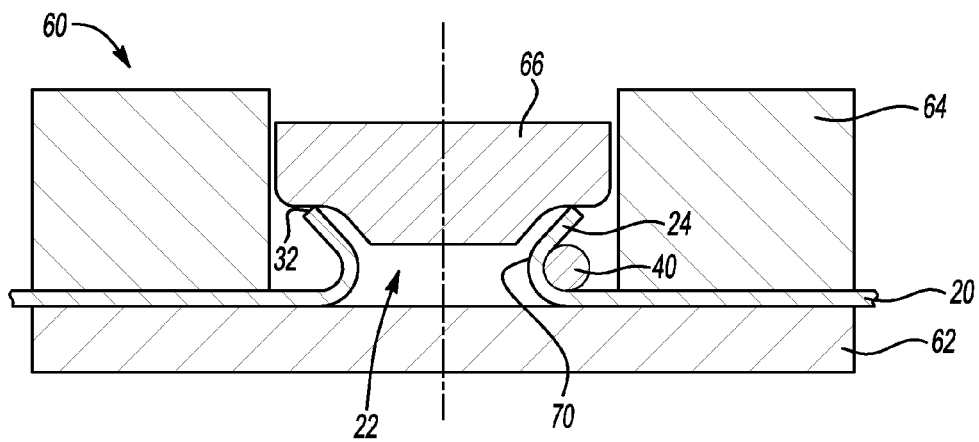
FIG. 9 is a cross-sectional view of a die in a middle phase of forming the flange back upon itself, wherein the right half of the view includes a reinforcement ring and the left half of the view does not include a reinforcement ring.
Figure 10:
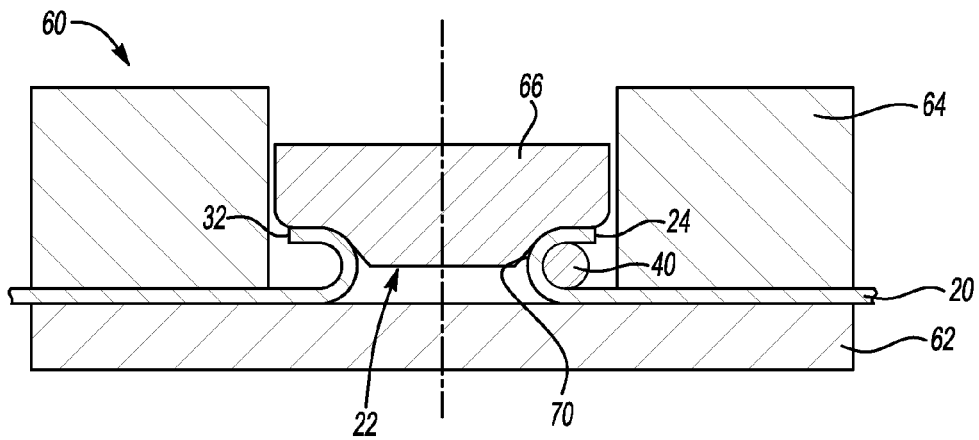
FIG. 10 is a cross-sectional view of a die in a final phase of forming the flange back upon itself, wherein the right half of the view includes a reinforcement ring and the left half of the view does not include a reinforcement ring.

Referring to FIGS. 8-10, a cross-sectional view of a die 60 is shown forming the flange 24 back upon itself in an initial phase, a middle phase, and a final phase. Each figure is bifurcated with the right half of the figure including a reinforcement ring 40 and the left half of the figure not including a reinforcement ring. The bifurcation is done to show that the flange forming process is the same with or without a reinforcement ring 40.

The forming process begins with the metal member 20 including the flange 24 defining the punched hole 22, as shown in FIG. 1. The sheared edge 32 is created when the hole 22 is punched in the metal member 20. The metal member 20 is held on a lower die 62 by a clamp 64. A punch 66 bends the sheared edge 32 of the flange 24 outwardly. This process provides a non-sheared surface 70 that defines the perimeter of the hole 22. The sheared edge 32 created in the hole punching operation is spaced from the perimeter of the hole 22.

As shown in the right half of FIGS. 8-10, a reinforcement ring 40 may be assembled around the flange 24 before the flange is formed back upon itself. The reinforcement ring 40 acts as a forming anvil that supports the flange 24 as the punch 66 forms the flange 24. The flange 24 retains the reinforcement ring 40 about the hole after the flange 24 is formed back upon itself.

The reinforcement ring 40 may be coated with a noncorrosive coating before assembling the reinforcement ring 40 around the flange 24. The reinforcement ring 40 may be coated with an adhesive that is applied around the flange 24 before the reinforcement ring 40 is assembled around the flange 24.

Alternatively, a single press could employ multiple punches to perform all operations in a single die.

Although several embodiments of the invention have been disclosed, it will be apparent to persons skilled in the art that modifications may be made without departing from the scope of the invention. All such modifications and equivalents thereof are intended to be defined by the following claims.

What is claimed is:

1. A combination of a metal member defining a hole having a fastener disposed therein, the combination comprising:
   a flange extending from one side of the metal member with a first surface opposite a second surface and a sheared edge extending therebetween, wherein the flange is turned back on the first surface with the second surface defining a perimeter of the hole and the sheared edge being continuous and spaced from the hole;
   a reinforcement ring disposed around the hole contacting a portion of the first surface; and
   a fastener disposed in the hole having a shaft contacting the second surface.

2. The combination of claim 1, in which the radial cross-section of the reinforcement ring is circular.

3. The combination of claim 2 wherein the circular cross-section of the reinforcement ring has an outer radius, the first surface has an inner radius, and the outer radius of the cross-section of the reinforcement ring is substantially similar to the inner radius of the first surface.

4. The combination of claim 1, in which the reinforcement ring is formed of a material that has a higher tensile strength than the metal member.

5. The combination of claim 1, further comprising a noncorrosive coating on the reinforcement ring.

6. The combination of claim 1, further comprising adhesive applied to the surface of the reinforcement ring to bond the reinforcement ring to the metal member.

7. The combination of claim 1 wherein the flange of the metal member wraps around a portion of the reinforcement ring, the fastener has a head extending from one end of the shaft, the fastener has a second end of the shaft capable of being fastened to another object, and wherein that the head of the fastener sandwiches the ring within the flange when the fastener is fastened to another object.

8. The combination of claim 1 wherein the reinforcement ring is a forming anvil for the flange.

9. The combination of claim 1 further comprising the metal member having a first side opposite a second side wherein the first surface of the flange extends continuously from the first side of the metal member to the sheared edge, the second surface of the flange extends continuously from the second side of the metal member to the sheared edge, and the flange has a continuous and substantially constant bend radius between the first and second sides of the metal member and the sheared edge.

10. The combination of claim 1 wherein the reinforcement ring is a single unitary piece that is a continuous closed-loop ring around the hole.

11. The combination of claim 1 wherein the metal member comprises aluminum.

12. The combination of claim 1 wherein the reinforcement ring comprises steel.

13. A combination comprising:
   an aluminum panel having a reversely turned flange defining a hole, the flange having a continuous sheared edge adjacent a rolled surface, wherein the rolled surface extends from the panel to the sheared edge and defines the hole;
   a reinforcement ring disposed around the flange; and
   a fastener disposed in the hole with a shaft that contacts a portion of the rolled surface.

14. The combination of claim 13, in which the fastener has a head with a surface substantially perpendicular to the shaft such that the head surface contacts the flange between a portion of the rolled surface defining a perimeter of the hole and the sheared edge.

15. The combination of claim 13, in which the rolled surface has a substantially constant bend radius, and the reinforcement ring has a thickness that corresponds to the bend radius of the rolled surface.

16. The combination of claim 15 wherein the bend radius of the rolled surface is substantially equal to a cross-sectional radius of the reinforcement ring plus a thickness of the panel.

17. The combination of claim 15 wherein the bend radius of the rolled surface is equal to or greater than half a thickness of the reinforcement ring plus a thickness of the panel.

18. The combination of claim 13 wherein the fastener has a head with a first outermost periphery diameter, the reinforcement ring has a second outermost periphery diameter, and the first outermost periphery diameter of the fastener head is greater than the second outermost periphery diameter of the reinforcement ring.

19. The combination of claim 13 wherein the fastener has a head with a first width in a transverse direction, the reinforcement ring has a second width in the transverse direction, and the first width of the fastener is greater than the second width of the reinforcement ring in the transverse direction.

20. The combination of claim 13 wherein the fastener has a head with a first width, the sheared edge has an outer diameter, and the first width of the fastener head is greater than the outer diameter of the sheared edge.

* * * * *